US010077199B2

(12) United States Patent
Johnson et al.

(10) Patent No.: US 10,077,199 B2
(45) Date of Patent: Sep. 18, 2018

(54) FLUID FILTRATION SYSTEM

(71) Applicant: GREEN AGE TECHNOLOGIES LLC, Tyler, TX (US)

(72) Inventors: Arthur Johnson, Longview, TX (US); Brandon Johnson, Longview, TX (US); Martin Margulies, Pagosa Springs, CO (US)

(73) Assignee: Green Age Technologies LLC, Tyler, TX (US)

( * ) Notice: Subject to any disclaimer, the term of this patent is extended or adjusted under 35 U.S.C. 154(b) by 668 days.

(21) Appl. No.: 14/330,757

(22) Filed: Jul. 14, 2014

(65) Prior Publication Data

US 2014/0319072 A1     Oct. 30, 2014

Related U.S. Application Data

(62) Division of application No. 13/958,305, filed on Aug. 2, 2013, now Pat. No. 9,115,013.

(60) Provisional application No. 61/683,712, filed on Aug. 15, 2012.

(51) Int. Cl.
| | |
|---|---|
| *C02F 1/00* | (2006.01) |
| *B01D 35/14* | (2006.01) |
| *B01D 35/00* | (2006.01) |
| *B01D 21/24* | (2006.01) |
| *B01D 29/07* | (2006.01) |
| *C02F 1/52* | (2006.01) |
| *C02F 1/34* | (2006.01) |

(52) U.S. Cl.
CPC ............ *C02F 1/5209* (2013.01); *C02F 1/001* (2013.01); *C02F 1/004* (2013.01); *C02F 1/34* (2013.01); *C02F 2209/005* (2013.01); *C02F 2209/03* (2013.01); *C02F 2209/05* (2013.01)

(58) Field of Classification Search
CPC ...... B01D 65/02; B01D 61/147; B01D 61/22; B01D 2311/16; B01D 61/08; B01D 2321/04; B01D 61/10; B01D 2321/40; B01D 2313/243
USPC ........ 210/650–652, 499, 767, 85, 86, 90, 97
See application file for complete search history.

(56) References Cited

U.S. PATENT DOCUMENTS

| | | | | |
|---|---|---|---|---|
| 4,352,739 A | * | 10/1982 | Oliver, Jr. ............. | B01D 21/00 210/108 |
| 5,047,154 A | * | 9/1991 | Comstock ............. | B01D 61/22 210/321.69 |
| 5,520,816 A | * | 5/1996 | Kuepper ............... | B01D 61/025 210/137 |
| 5,958,244 A | * | 9/1999 | Hartmann ............. | B01D 61/025 210/195.2 |
| 6,607,669 B2 | * | 8/2003 | Schick ................. | B01D 61/145 210/103 |
| 9,115,013 B2 | * | 8/2015 | Johnson ................ | C02F 1/004 |

(Continued)

*Primary Examiner* — Ana Fortuna
(74) *Attorney, Agent, or Firm* — Conley Rose, P.C.

(57) ABSTRACT

A method of filtering a fluid, including flowing a fluid from a first side of a filter member to a second side of the filter member, the fluid containing dissolved impurities. In addition, the method includes inducing fluid cavitation within the fluid to precipitate out at least a portion of the dissolved impurities. Further, the method includes controlling a pressure differential across the filter member. Still further, the method includes, maintaining or further inducing the fluid cavitation within the fluid in response to controlling the pressure differential. Related systems are also disclosed.

7 Claims, 15 Drawing Sheets

(56) References Cited

U.S. PATENT DOCUMENTS

2008/0156710 A1\* 7/2008 Onota ................... B01D 61/04
                                                    210/109
2010/0038292 A1\* 2/2010 Fike .................... B01D 61/025
                                                    210/87
2013/0068674 A1\* 3/2013 Manabe ................ B01D 61/12
                                                    210/96.2

\* cited by examiner

FLUID FILTRATION SYSTEM

CROSS-REFERENCE TO RELATED APPLICATION

The present application is a divisional of U.S. patent application Ser. No. 13/958,305, filed on Aug. 2, 2013, entitled "Fluid Filtration System," and claiming priority to U.S. Provisional Patent Application No. 61/683,712, filed on Aug. 15, 2012, both of which are hereby incorporated herein by reference.

BACKGROUND

The present disclosure relates to filtration or filtering systems for fluids. More particularly, the disclosure relates to a filtering system to remove particulate matter from a fluid. The filtering system is configured to remove solid particles from the fluids such that the fluids can then be recycled.

In modern industrial practice, it is common to filter fluids (e.g., liquids) in order to prepare such fluids for use, reuse, and/or introduction into the natural environment. For example, water used and produced in oil and gas well fracturing (or stimulation) operations requires treatment or processing before re-use and disposal. The water is treated to remove chemicals that were added to the water before use and/or chemicals and sediment suspended in the water after use as a by-product of the well stimulation. The water, commonly referred to as used flowback fracturing ("frac") water and produced water, may have been processed to ensure that it is capable of being used initially for stimulating oil and gas wells and is again processed for that purpose. Without appropriate treatment, contaminants or other suspended particulate matter entering the frac water can cause formation damage, plugging, lost production, and increased demand for chemical treatment additives. In addition, the water is processed for disposal, for example, to prevent contamination of ground water resources.

Because the filtered fluids and the suspended contaminants and particulates can vary widely depending on the specific application, it is advantageous for a filtering system (or systems) to be configured to receive and filter various fluids, and to be adaptable or adjustable to filter such fluids using a single system.

SUMMARY

In some embodiments, a method of filtering a fluid includes flowing a fluid from a first side of a filter member to a second side of the filter member, the fluid containing dissolved impurities. In addition, the method includes inducing fluid cavitation within the fluid to precipitate out at least a portion of the dissolved impurities. Further, the method includes controlling a pressure differential across the filter member. Still further, the method includes maintaining or further inducing the fluid cavitation within the fluid in response to controlling the pressure differential.

In some embodiments, a system for filtering a fluid includes a filter assembly further including a vessel defining a pressure chamber. In addition, the filter assembly includes a filter screen disposed within the vessel, the screen dividing the pressure chamber into a first subchamber and a second subchamber. Further, the filter assembly includes a first pressure sensor configured to sense a pressure within the first subchamber and generate a first pressure signal. Still further, the filter assembly includes a second pressure sensor configured to sense a pressure within the second subchamber and configured to generate a second pressure signal. In addition, the system includes a first pump fluidly coupled to the filter assembly, the first pump having a discharge pressure. Further, the system includes a controller electrically coupled to the first sensor, the second sensor, and the first pump, wherein the controller is configured to adjust the discharge pressure of the first pump based on the first pressure signal and the second pressure signal to induce or maintain cavitation within the fluid as the fluid flows from the first subchamber to the second subchamber.

In some embodiments, a method of filtering a fluid includes flowing a fluid into a filter assembly, wherein the filter assembly comprises a vessel defining a pressure chamber. In addition, the filter assembly includes a filter screen disposed within the vessel, the screen dividing the pressure chamber into a first subchamber and a second subchamber. In addition, the method comprises flowing the fluid from the first subchamber to the second subchamber. Further, the method comprises controlling a first pressure of the first subchamber relative to a second pressure of the second subchamber to induce cavitation in the flowing fluid. Still further, the method comprises precipitating out dissolved impurities within the fluid during the cavitation.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
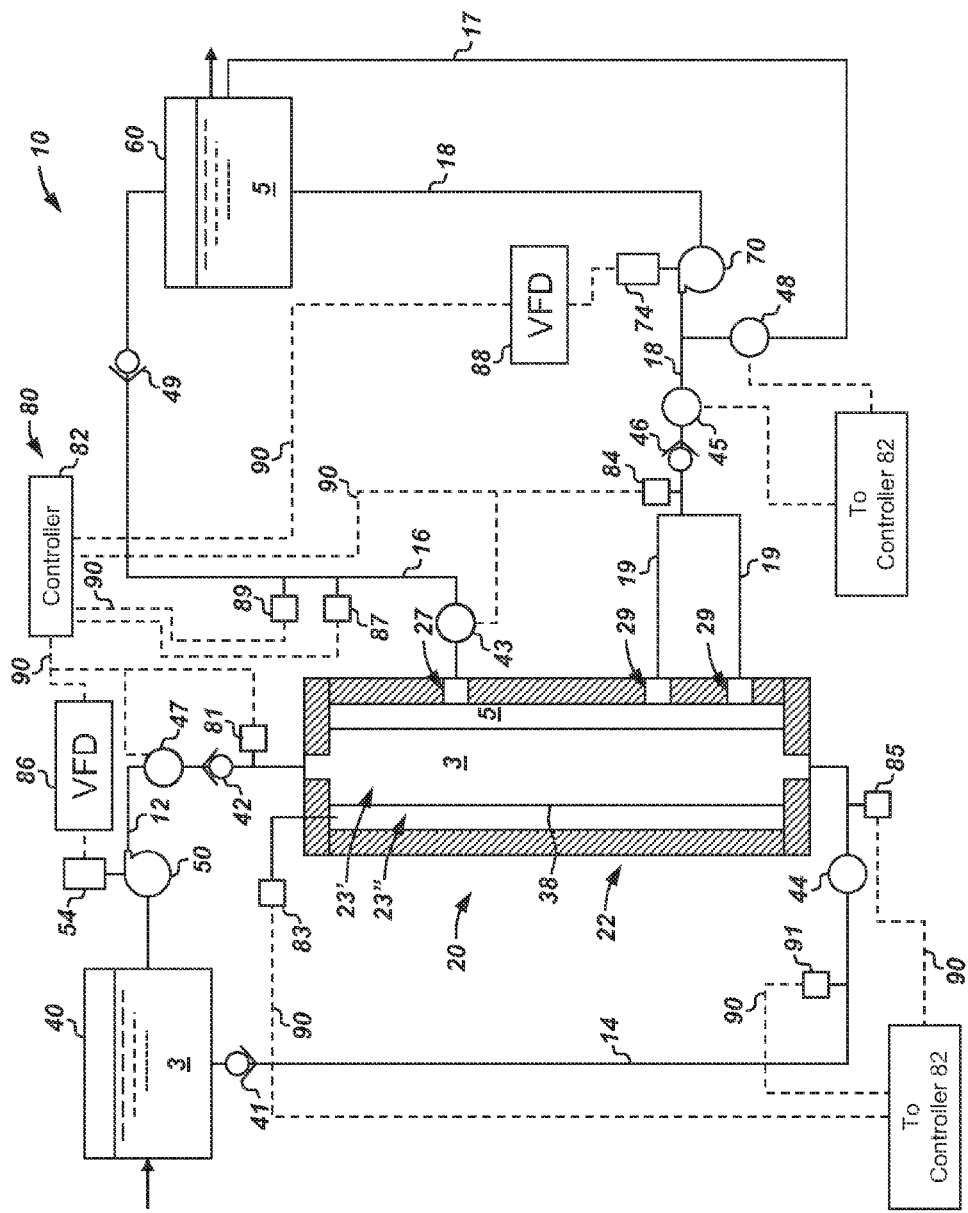
FIG. 1 is a schematic, partial cross-sectional view of an embodiment of a filter system in accordance with the principles disclosed herein.

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct mechanical connection, or an indirect, direct, optical or wireless electrical connection. Thus, if a first device couples to a second device, that connection may be through a direct mechanical or electrical connection, through an indirect mechanical or electrical connection via other devices and connections, through an optical electrical connection, or through a wireless electrical connection. In addition, as used herein the terms "axial" and "axially" generally mean along or parallel to a central axis (e.g., central axis of a body or port), while the terms "radial" and "radially" generally mean perpendicular to the central axis. For instance, an axial distance refers to a distance measured along or parallel to the central axis, and a radial distance means a distance measured perpendicular to the central axis. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

In the following description and figures, embodiments of a filter system are described for filtering both suspended and dissolved impurities from flowback frac water. However, it should be appreciated that embodiments of the filter system described herein and methods relating thereto may be utilized in a wide variety of systems and applications which employ such systems to filter suspended and dissolved solids from a liquid (e.g., water). For example, embodiments of the filtering system described herein may be used to filter both suspended and dissolved particulates (e.g., sodium chloride) from sea water. Therefore, filtering of flowback frac water is merely one of many potential uses of the filtering system and methods described herein. Thus, any reference to flowback frac water (or any other fluid) and related subject matter is merely included to provide context to the description contained herein and is in no way meant to limit the scope thereof. At various times, the word "filter" may also be interchanged with words such as "filtering" or "filtration," though no difference in meaning is intended unless otherwise noted.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring to FIG. 1, an embodiment of a filter system 10 is shown. The filter system 10 generally comprises a filter assembly 20, a start or dirty tank 40, a finish or clean tank 60, a first or feed pump 50, a second or reversing pump 70, and a control system 80.

Each of the components (e.g., tanks 40, 60, assembly 20, pumps 50, 70) of system 10 are fluidly coupled together through a plurality of conduits 12, 14, 16, 17, 18, 19. In particular, system 10 includes a feed line 12, a flush line 14, a discharge line 16, a return line 18, a recirculation line 17, and a pair of injection lines 19. Each of the lines 12, 14, 16, 17, 18, 19 comprises any suitable conduit capable of channeling fluids therethrough. For example, lines 12, 14, 16, 17, 18, 19 may comprise pipes, hoses, open water channels, or other fluid conveyances, while still complying with the principles disclosed herein.

Further, system 10 also includes a plurality of valves disposed at various locations along lines 12, 14, 16, 17, 18, 19 to control the flow of fluids through system 10 during operation. In particular, a check valve 42 is disposed along feed line 12 and is configured to restrict fluid flow from assembly 20 toward feed pump 50. An actuatable valve 47 is also disposed along feed line 12 to selectively control fluid communication between tank 40 and assembly 20 along line 12. In addition, a check valve 41 is disposed along flush line 14 and is configured to restrict fluid flow from tank 40 toward assembly 20 along line 14. An actuatable valve 44 is also disposed along flush line 14 to selectively control fluid flow between assembly 20 and tank 40 along line 14. Further, a check valve 49 is disposed along discharge line 16 and is configured to restrict fluid flow from tank 60 toward assembly 20. An actuatable valve 43 is also disposed along the discharge line 16 to selectively control fluid communication between assembly 20 and tank 60 along line 16. Still further, a check valve 46 is disposed along return line 18 and is configured to restrict fluid flow from injection lines 19 toward reversing pump 70. An actuatable valve 43 is also disposed along line 18 to selectively control fluid flow between pump 70 and assembly 20 along lines 18, 19. Still further, an actuatable valve 48 is disposed along recirculation line 17 to selectively control fluid flow between pump 70 and tank 60 along line 17.

Each of the check valves 41, 42, 46, 49 may be any suitable valve which allows fluid flow in only one direction.

For example, in some embodiments, check valves 41, 42, 46, 49 may comprise a swing check valve, spring check valve, inline check valve, ball cone check valve, or some combination thereof while still complying with the principles disclosed herein. In addition, valves 41, 42, 46, 49 may comprise any suitable material and, in some embodiments, preferably comprise a corrosion resistant material. For example in some embodiments, valves 41, 42, 46, 49 comprise stainless steel or brass. Also, the valves 43, 44, 45, 47, 48 may be any suitable valve for controlling the flow of fluids along a conduit. For example, in some embodiments, the valves 43, 44, 45, 47, and 48 may comprise electro-magnetic valves, electro-hydraulic valves, electro-mechanical valves, or some combination thereof. Further, in some embodiments, each of the valves 43, 44, 45, 47, and 48 may comprise a pinch valve, ball valve, gate valve, knife valve, pneumatic valve, hydraulic valve, electronic solenoid valve, or some combination thereof. Still further, in some embodiments, valves 43, 44, 45, 47, and 48 may comprise any suitable material and, in some embodiments, preferably comprise a corrosion resistant material. For example, in some embodiments, valves 43, 44, 45, 47, and 48 comprise stainless steel or brass.

Figure 2:
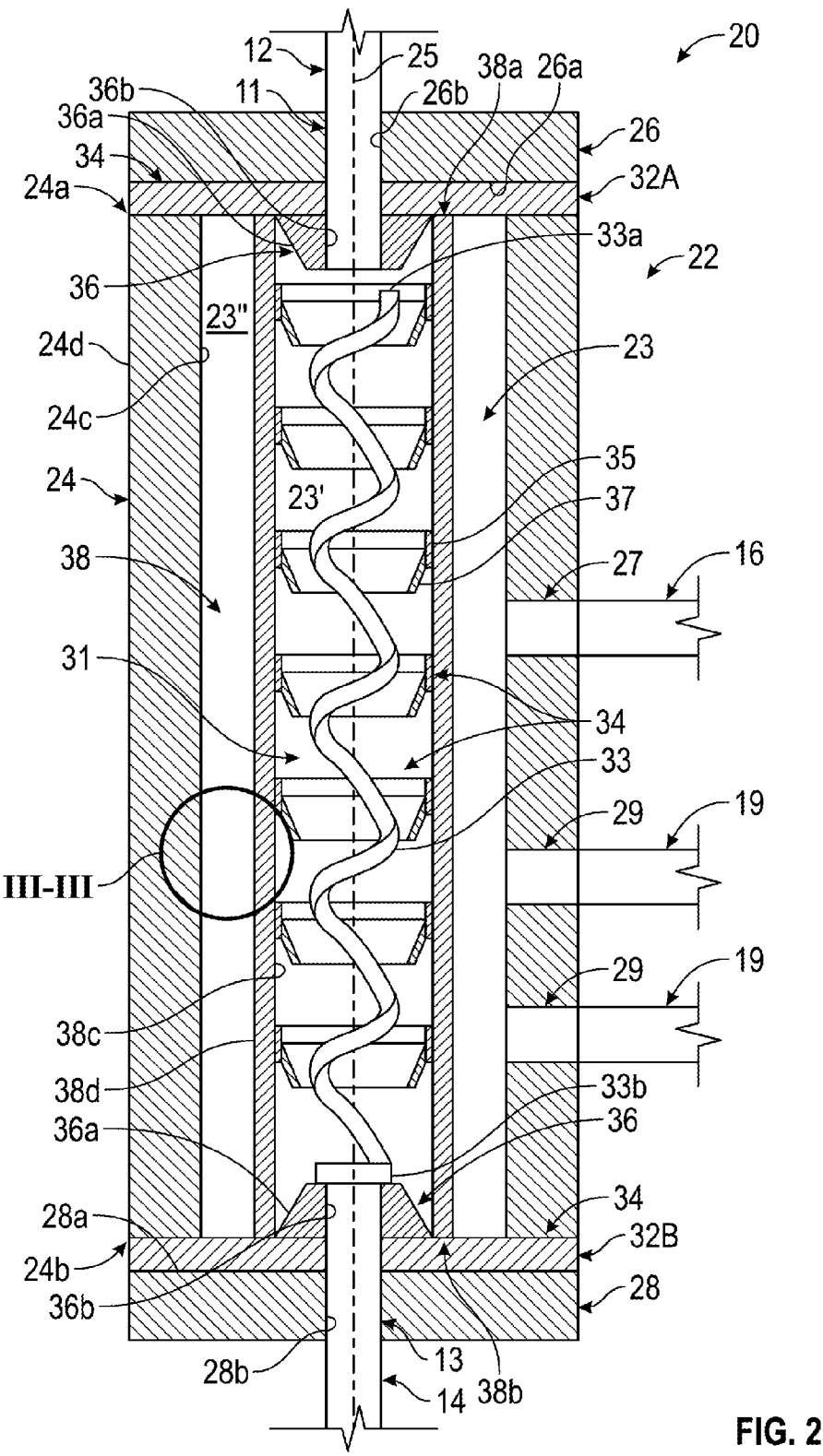
FIG. 2 is a schematic, partial cross-sectional view of an embodiment of the filter assembly of the filter system of FIG. 1.

Referring now to FIG. 2, in this embodiment, the filter assembly 20 includes a pressure housing or vessel 22, and a filter member or screen 38. Vessel 22 generally includes an elongate tubular body 24, having a central, longitudinal axis 25, a first or upper end 24a, a second or lower end 24b opposite the upper end 24a, a radially inner surface 24c extending axially between the ends 24a, 24b, and a radially outer surface 24d extending axially between the ends 24a, 24b. In this embodiment, a main clean water outlet 27 is axially disposed between the ends 24a, 24b and extends radially between the surfaces 24c, 24d, while a pair of return inlets 29 are axially disposed between the clean water outlet 27 and the lower end 24b and each also extends radially between the surfaces 24c, 24d. clean water outlet 27 is coupled to discharge line 16, while return inlets 29 are each coupled to one of the injection lines 19, previously described. It should be appreciated that in other embodiments the specific locations of the inlets 27 and outlets 29 may be altered and varied while still complying with the principles disclosed herein.

In this embodiment, vessel 22 also includes a first or upper intermediate cap 32A axially disposed at upper end 24a of body 24 and a second or lower intermediate cap 32B axially disposed at lower end 24b. Each intermediate cap 32A, 32B is generally configured the same and includes a first or coupling portion 34 and a second or funnel portion 36. Coupling portion 34 is generally cylindrical in shape and is configured to engage with body 24 during construction of assembly 20. Funnel portion 36 of each intermediate cap 32A, 32B generally extends axially from the coupling portion 34 and includes an outer frustoconical surface 36a and a throughbore 36b. Further, vessel 22 includes a first or upper cap 26 including a sealing surface 26a and a throughbore 26b, and a second or lower cap 28 including a sealing surface 28a and throughbore 28b.

Figure 3:
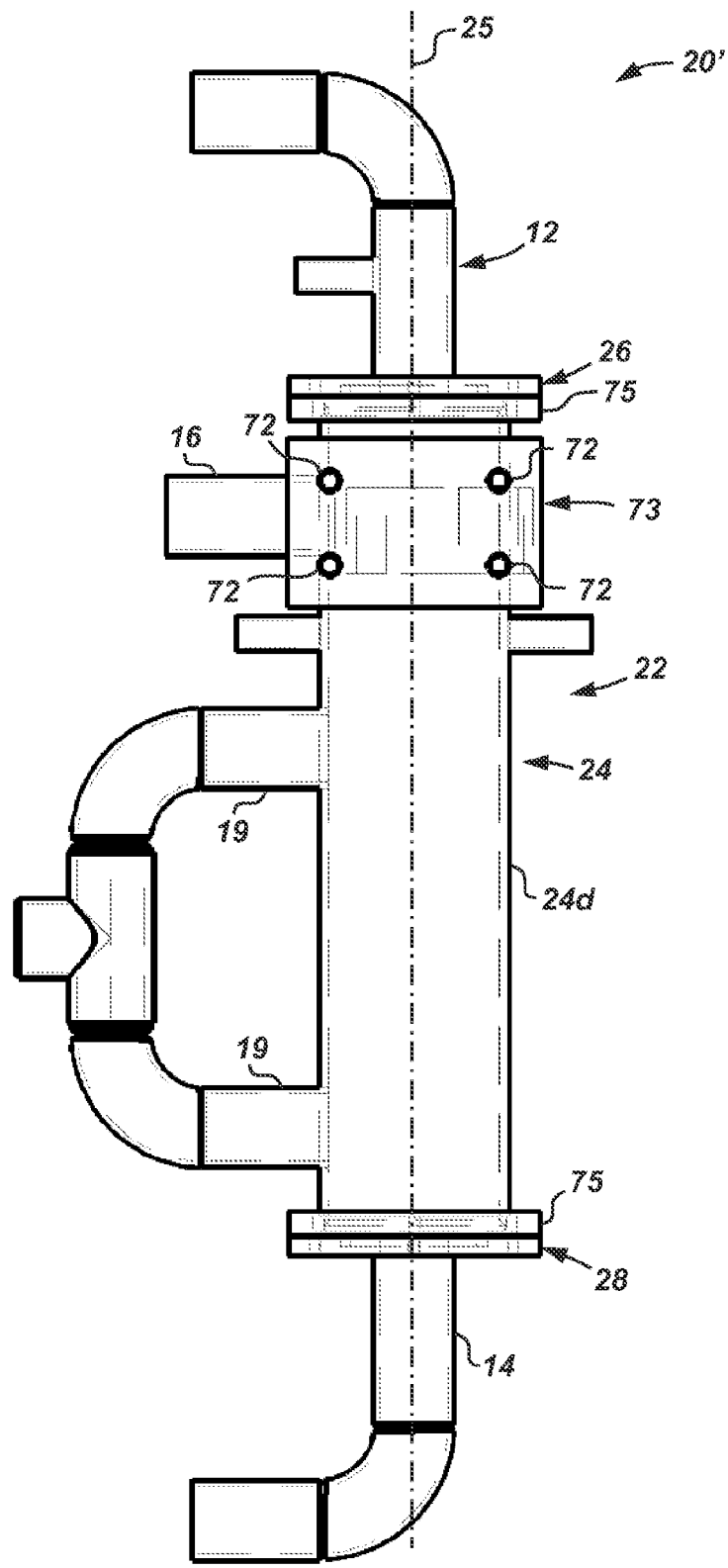
FIG. 3 is a side view of an alternative embodiment of the filter assembly of the filter system of FIG. 1.

It should be appreciated that in some embodiments, intermediate caps 32A, 32B are removed from vessel 22 while still complying with the principles disclosed herein. For example, referring briefly to FIG. 3, wherein an alternative embodiment of filter assembly 20 (designated as assembly 20') is shown. Filter assembly 20' includes many similar components relative to the filter assembly 20. As a result, like reference numerals are used for like components and features, and shared components may not be called out or discussed in detail with reference to FIG. 3, but the same description with regard to FIG. 2 applies equally to the assembly 20' of FIG. 3 unless otherwise noted. Instead, the focus of the discussion will be on variations or differences in the filter assembly 20' over the filter system 20. For example, in assembly 20', intermediate caps 32A, 32B are not disposed between caps 26, 28 and body 24 of vessel 22 and caps 26, 28 each directly couple to body 24 through a pair of mating flanges 75. In addition, the embodiment of assembly 20' shown in FIG. 3 also includes a mounting plate 73 which further includes a plurality of mounting apertures or holes 72. During operation, plate 73 is used to fix or mount assembly 20' to a surface or particular position by aligning holes 72 with corresponding holes on a mounting surface (not shown) and then engaging a securing member (e.g., screw, nail, bolt, rivet) through each of the holes 72 (and the aligned holes on the mounting surface). However, it should be appreciated that in some embodiments, any other suitable mounting device or assembly (other than plate 73) may be used while still complying with the principles disclosed herein. Additionally, in some embodiments, no mounting assembly or device is included.

Referring back now to FIG. 2, during assembly of filter assembly 20, intermediate caps 32A, 32B are axially disposed between caps 26, 28 such that coupling portion 34 of intermediate cap 32A is axially disposed between sealing surface 26a of cap 26 and upper end 24 of body, and coupling section 34 of cap 28 is axially disposed between sealing surface 28a of cap 28 and lower end 24b of body 24. Body 24, intermediate caps 32A, 32B, and caps 26, 28 may be secured to one another through any suitable method while still complying with the principles disclosed herein. For example, in some embodiments body 24, intermediate caps 32A, 32B, and caps 26, 28 may be secured to one another with bolts, rivets, welding, sintering, or some combination thereof.

When the caps 26, 28 and intermediate caps 32A, 32B are coupled to the ends 24a, 24b of body 24, respectively, a sealed inner pressure chamber 23 is formed that is defined by the surface 24c and intermediate caps 32A, 32B. As will be described in more detail below, chamber 23 receives fluid (e.g., used flowback frac water, salt water) from dirty tank 40 during operations in order to facilitate cleaning and filtering thereof. In some embodiments, chamber 23 may have a maximum allowable pressure of 450 psi, and an operating pressure of less than 100 psi; however, it should be appreciated that in other embodiments, the maximum allowable and operating pressures may vary. In addition, during construction of assembly 20, the throughbore 36b of upper intermediate cap 32A and the throughbore 26b of upper cap 26 are each coaxially aligned along axis 25 to form a main dirty water inlet 11 into chamber 23. The throughbore 38b of lower intermediate cap 32B and the throughbore 28b of lower cap 28 are also coaxially aligned along axis 25 to form a flush fluid outlet 13 from chamber 23. In this embodiment, inlet 11 is coupled to feed line 12, while flush fluid outlet 13 is coupled to flush line 14. Further, in some embodiments, many features of a filter assembly 20 (e.g., vessel 22, caps 26, 28, and intermediate caps 32A, 32B) comprise stainless steel; however, in other embodiments, the features of assembly 20 may comprise various other materials such as, for example, carbon fiber, or steel alloys.

Figure 4:
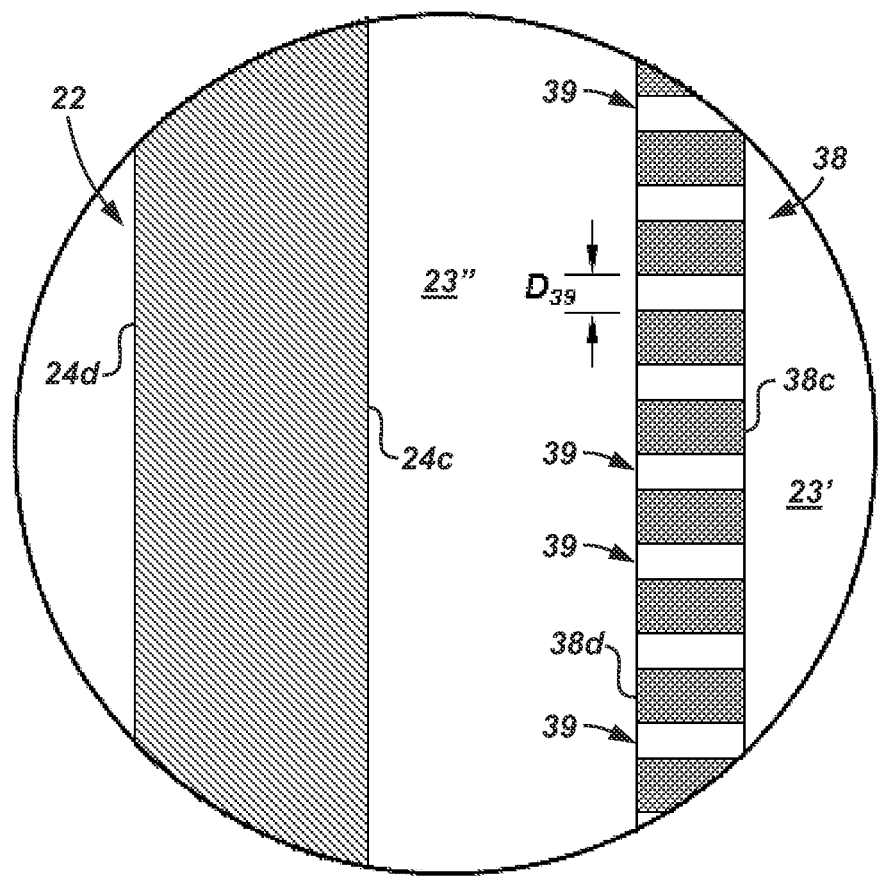
FIG. 4 is an enlarged schematic, cross-sectional view of the filter screen of the filter assembly of FIG. 2 taken along portion III-III.

Referring now to FIGS. 2 and 4, a tubular filter member or screen 38 is disposed within chamber 23 and is coaxially aligned with the axis 25. In this embodiment, screen 38 is a substantially cylindrical tube that includes a first or upper end 38a, a second or lower 38b opposite the upper end 38a, a radially inner surface 38c extending between the ends 38a, 38b, and a radially outer surface 38d also extending between the ends 38a, 38b. As is best shown in FIG. 4, a plurality of apertures or holes 39 extend generally radially between the surfaces 38c, 38d and are disposed axially between the ends 38a, 38b. Holes 39 may be formed of any shape or cross-section while still complying with the principles disclosed herein. For example, in some embodiments, holes 39 may be circular, elliptical, polygonal, triangular, or diamond shaped. Further, regardless of the shape of holes 39, each hole 39 has a maximum diameter or clearance $D_{39}$, which thus defines the maximum particle size which hole 39 will allow to pass therethrough. In some embodiments, diameter $D_{39}$ may range from 1 to 100 μm depending on the type of fluids to be filtered by assembly 20 while still complying with the principles disclosed herein. In some embodiments, screen 38 comprises a sintered wire mesh or a sintered "Dutch Twill" and may further include a lattice structure to withstand operating pressures within chamber 23. Also, in some embodiments, screen 38 comprises stainless steel, although any suitable material may be used, such as, for example, carbon fiber, a ceramic, a synthetic material, or some combination thereof.

Figure 5:
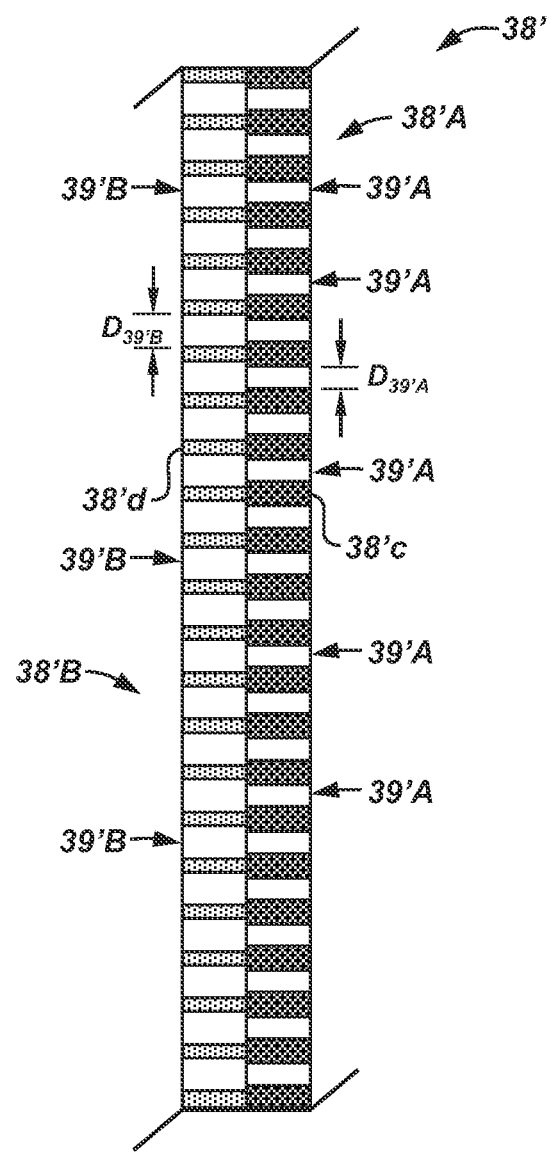
FIG. 5 is an enlarge schematic cross-sectional view of an alternative embodiment of the filter screen of the filter assembly of FIG. 2.

Reference is now made to FIG. 5, wherein an alternative embodiment of screen 38' is shown. As with screen 38, previously described, screen 38' is a substantially cylindrical tube that includes a radially inner surface 38'c and a radially outer surface 38'd. In addition, screen 38' comprises multiple radially stacked layers that are sintered or otherwise engaged to one another. For example, in this embodiment, screen 38' comprises a first or inner layer 38'A and a second or outer layer 38'B; however, it should be appreciated that in other embodiments, more than two layers (e.g., layers 38'A, 38'B) may be included. In this embodiment, inner layer 38'A includes a plurality of apertures or holes 39'A extending radially from the surface 38'c to the outer layer 38'B, while the outer layer 38'B includes a plurality of apertures or holes 39'B extending radially from the inner layer 38'A to the radially outer surface 38'd. As previously described for holes 39 of screen 38, each hole 39'A, 39'B may comprise any shape while still complying with the principles disclosed herein. For example, in some embodiments, holes 39'A, 39'B may be circular, elliptical, polygonal, triangular, or diamond shaped. Further, each hole 39'A has a maximum diameter or clearance $D_{39'A}$ and each hole 39'B has a maximum diameter or clearance $D_{39'B}$. Each of the diameters $D_{39'A}$, $D_{39'B}$ may range from 1 to 100 μm, and in this embodiment, the diameter $D_{39'B}$ is larger than the diameter $D_{39'A}$. However, it should be appreciated that in other embodiments, the relative sizing of diameters $D_{39'A}$, $D_{39'B}$ may vary greatly while still complying with the principles disclosed herein. For example, in some embodiment, the diameter $D_{39'A}$ is larger than the diameter $D_{39'B}$ while in other embodiments, the diameters $D_{39'A}$, $D_{39'B}$ are substantially the same. As previously described above for screen 38, in some embodiments layers 38'A, 38'B of screen 38' may each comprise a sintered wire mesh or a sintered "Dutch Twill" and may further include a lattice structure to withstand operating pressures within chamber 23. Also, in some embodiments, screen 38' comprises stainless steel, although any suitable material may be used, such as, for example, carbon fiber, a ceramic, a synthetic material, or some combination thereof.

Referring back to FIG. 2, screen 38 (or screen 38' in some embodiments) is disposed within chamber 23 such that upper end 38a engages or abuts upper intermediate cap 32A and lower end 38b engages or abuts lower intermediate cap 32B. For embodiments that do not includes intermediate caps 32A, 32B (e.g., assembly 20' shown in FIG. 3) ends 38a, 38b of screen 38 may directly engage sealing surfaces 26a, 28a of end caps 26, 28, respectively. Therefore, when screen 38 is installed within vessel 22, chamber 23 is divided into a first or inner subchamber 23' and a second or outer subchamber 23". In some embodiments, screen 38 is merely placed within chamber 23; however, it should be appreciated that in other embodiments, screen 38 is secured within chamber 23 during construction of assembly 20. In these embodiments, screen 38 may be secured to the intermediate caps 32A, 32B and/or the caps 26, 28 by any suitable method, such as, for example bolts, rivets, welding, sintering, or some combination thereof.

Figure 6:
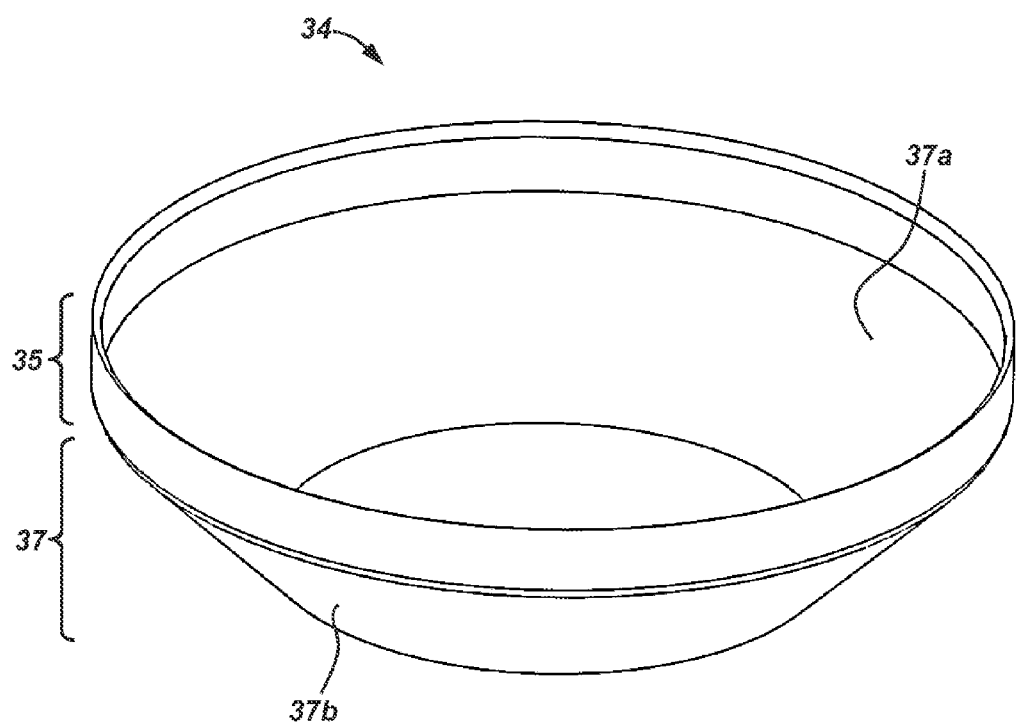
FIG. 6 is a perspective view of one of the media vortex generator cups of the filter assembly of FIG. 2.

Referring still to FIG. 2, in some embodiments, assembly 20 further includes a spiral vortex generator 31 and/or a plurality of vortex generating cups 34. Spiral vortex generator 31 comprises a generally helically shaped body 33 that includes a first or upper end 33a and a second or lower end 33b opposite the upper end 33a. Vortex generator 31 is disposed within inner subchamber 23' of chamber 23 such that the lower end 33b is seated on funnel section 36 of lower intermediate cap 32B and generator 31 is substantially coaxially aligned with axis 25. Vortex generating cups 34 are funnel-like structures that are disposed along the radially inner surface 38c of screen 38. In particular, referring briefly to FIG. 6, each cup 34 includes a coupling section 35 and a baffle 37. Coupling section 35 comprises a cylindrical band while baffle 37 extends from section 35 and includes a frustoconical outer surface 37a and a frustoconical inner surface 37b. In some embodiments, section 35 and baffle 37 are monolithically formed; however, it should be appreciated that in other embodiments, section 35 and baffle 37 are not monolithically formed. As is best shown in FIG. 2, cups 34 are disposed within inner subchamber 23' such that both sections 35 and baffles 37 are coaxially aligned with axis 25 and coupling section 35 is secured to the radially inner surface 38c of screen 38. Any suitable coupling or securing method may be employed to mount coupling section 35 to surface 38c such as, for example, welding, sintering, bolts, rivets, an adhesive, or some combination thereof while still complying with the principles disclosed herein. As will be described in more detail below, during operation of system 10 each of the cups 34 and the generator 31 generate flow patterns within fluids being routed from the inner subchamber 23', through screen 38 and into outer subchamber 23" in order to promote substantially even distribution of particulates along surface 38c of screen 38 to enhance the performance of system 10. However, it should be appreciated that in other embodiments, the vortex generator 31 and/or the vortex generator cups 34 are not included in assembly 20 while still complying with the principles disclosed herein.

Figure 7:
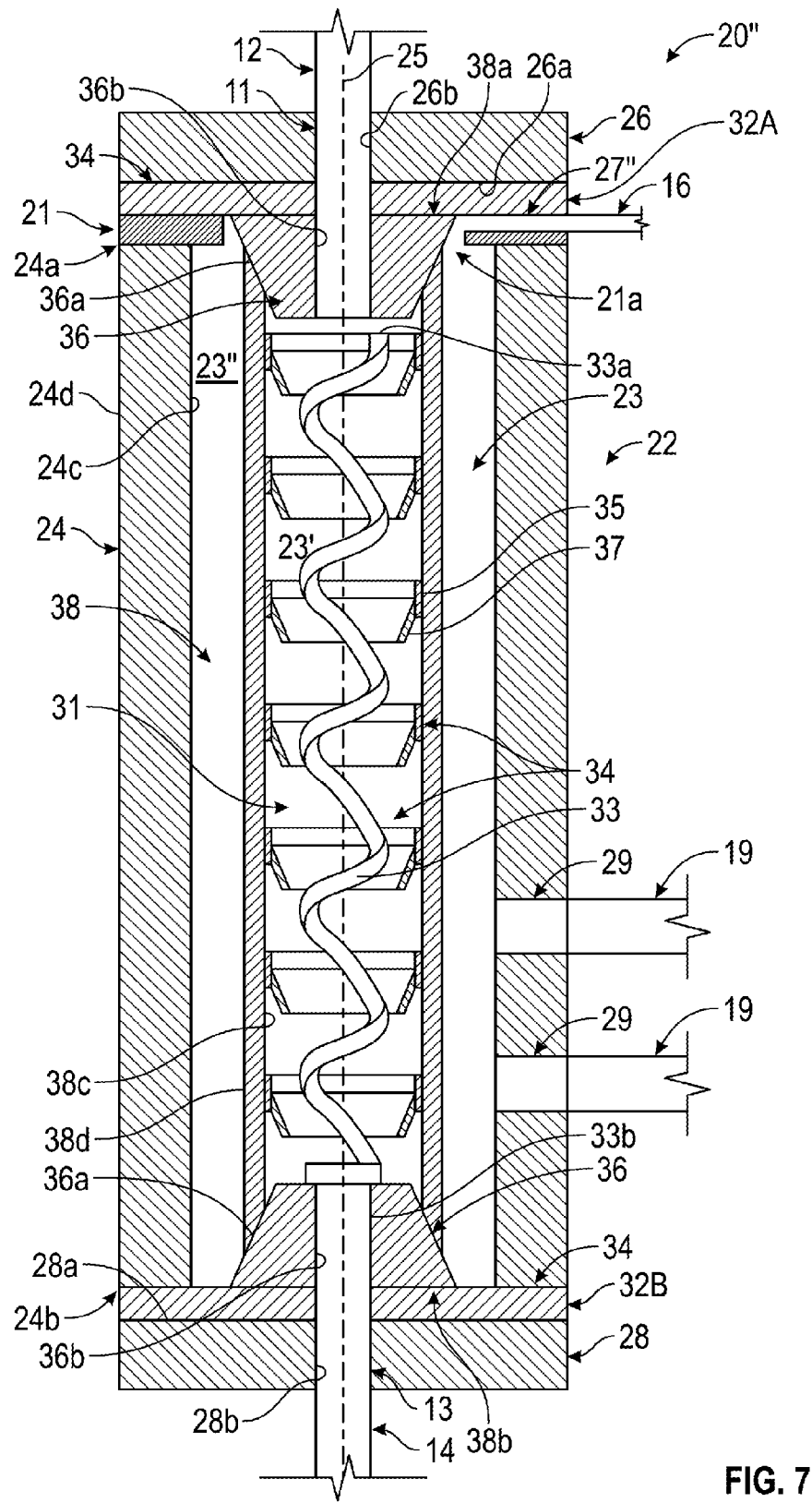
FIG. 7 is a schematic, partial cross-sectional view of an alternative embodiment of the filter assembly of the filter system of FIG. 1.

Referring briefly to FIG. 7, wherein another alternative embodiment of filter assembly 20" is shown. Filter assembly 20" includes many similar components relative to the filter assembly 20. As a result, like reference numerals are used for like components and features, and shared components may not be called out or discussed in detail with reference to FIG. 7, but the same description with regard to FIG. 2 applies equally to the assembly 20" of FIG. 7 unless otherwise noted. Instead, the focus of the discussion will be on variations or differences in the filter assembly 20" over the filter system 20. For example, in this embodiment, upper end 38a of screen 38 abuts or engages outer frustoconical surface 36a of intermediate cap 32A and lower end 38b of screen 38 abuts or engages outer frustoconical surface 36a of intermediate cap 32B. Additionally, assembly 20" further includes a plate member 21 axially disposed between upper end 24a of body 24 and coupling portion 34 of intermediate cap 32A. Plate member 21 includes a axially oriented aperture or hole 21a configured to receive funnel portion 36 of upper intermediate cap 32A. In this embodiment, a main discharge fluid outlet 27" is defined between the funnel portion 36 of intermediate cap 32A and the plate member 21. Specifically, during operation, fluid flows through the space between the aperture 21a and portion 36 of upper intermediate cap 32A and then through outlet 27" into line 16. As a result, assembly 20" does not include discharge outlet 27, previously described for assembly 20. Thus, through placement of the discharge outlet 27' in the manner shown in FIG. 6, the surface 38c of screen is more fully utilized and thus may offer an enhanced ability to both control the disposition of particulates on inner surface 32c and induce cavitation within the fluid during operation. In some embodiments, the plate member 21, upper intermediate cap 32A, and upper cap 26 are all monolithically formed; however, it should be appreciated that in other embodiments, member 21, intermediate cap 32A, and cap 26 are not monolithically formed while still complying with the principles disclosed herein. In addition, in some embodiments of assembly 20", no intermediate caps 32A, 32B are included (e.g., such as is the case for assembly 20' shown in FIG. 3) while still complying with the principles disclosed herein.

Referring back to FIG. 1, dirty tank 40 and clean tank 60 each comprise any suitable vessel or container capable of holding a volume of fluid (e.g., liquid and/or gas). In some embodiments, tanks 40, 60 may comprise a metal material; however, it should be appreciated that any suitable material (e.g., stainless steel, brass) may be used to construct tanks 40, 60 while still complying with the principles disclosed herein. Additionally, in other embodiments, tanks 40, 60 and may be disposed within a single container (not shown) such that each tank 40, 60 comprises a subchamber or section of the single container.

Referring still to FIG. 1, pumps 50 and 70 may comprise any suitable device for inducing flow for a fluid. For example, pumps 50, 70 may comprise any type of centrifugal or positive displacement style pump while still complying with the principles disclosed herein. In this embodiment, pumps 50 and 70 are each centrifugal pumps that include an impeller (not shown). Further, in this embodiment, each of the pumps 50, 70 is coupled to a motor 54, 74, respectively, that is configured to rotate the impeller of each respective pump 50, 70, via a shaft, to induce a flow of fluid therethrough. As the rotational speed of the shaft of each motor 54, 74 increases, the discharge pressure of the pumps 50, 70, respectively, also generally increases. Similarly, as the rotational speed of the shaft of each motor 54, 74 decreases, the discharge pressure of the pumps 50, 70, respectively, also generally decreases. Motors 54, 74 may comprise any suitable type of motor or actuator while still complying with the principles disclosed herein. For example, in some embodiments motors 54, 74 may comprise electric motors, hydraulic motors, internal combustion engines, or some combination thereof. In this embodiment, motors 54, 74 are electric motors that are configured to rotate their respective output shafts in response to an electrical input signal.

Referring still to FIG. 1, control system 80 generally comprises a central controller 82 that is electrically linked to various components within system 10 through a plurality of electrical conductors 90. In some embodiments, conductors 90 comprise electrical cables that are physically coupled to the controller 82 and the various components within system 10; however, it should be appreciated that in other embodiments, controller 82 is linked to the various components through a wireless connection (e.g., Wi-Fi, BLUETOOTH®, acoustic). Further, in this embodiment controller 82 includes programmable control logic, such as, for example, a proportional, integrator, derivative (PID) feedback control loop which, as will be described in more detail below, adjusts certain system parameters based on feedback obtained from measurements taken at various points throughout the system 10 in order to optimize cleaning operations.

Control system 80 also includes a plurality of sensors that are disposed within and between the various components of system 10 to measure various system parameters during operation thereof. In some embodiments, each of the sensors is configured to both sense a given parameter and transmit (e.g., through one of the conductors 90) data containing the measured value for processing. In this embodiment, a pressure sensor 81 is disposed along feed line 12 between pump 50 and assembly 20, an acoustic sensor 83 is coupled to vessel 22 of assembly, a pressure sensor 85 is disposed along flush line 14, a conductivity sensor 87 and a pressure sensor 89 are disposed along discharge line 16, and a pressure sensor 84 is disposed along return line 18. Additionally, in this embodiment, a flow rate sensor 91 is shown disposed along flush line 14; however, it should be appreciated that in other embodiments, multiple flow rate sensors (e.g., sensor 91) may be disposed throughout the system 10 to measure the flow rate of fluids flowing therethrough during operation. Additionally, in other embodiments, the sensor 83 may comprise a pressure, flow rate, or other sensor while still complying with the principles disclosed herein. As is shown in FIG. 1, each of the sensors 81, 83, 84, 85, 87, 89, 91 are all electrically coupled to controller 82 through conductors 90 previously described. Further, pressure sensors 81, 84, 85, 91 may comprise any suitable sensor for measuring the pressure of a fluid. For example, in some embodiments, pressure sensors 81, 84, 85, and 89 comprise ultrasonic sensors. Also, in some embodiments, pressure sensors are disposed in other portions of the filter system 10, such as within the assembly 20.

System 80 further includes a pair of variable frequency drives (VFD(s)) 86, 88 that are electrically coupled to controller 82 through conductors 90. In particular, a first VFD 86 is electrically coupled to motor 54, while a second VFD 88 is electrically coupled to motor 74. Each of the VFDs 86, 88 is configured to control the rotational speed of the motors 54, 74, respectively, by altering the electrical signal being routed to the motors 54, 74, respectively. Because the discharge pressure of the pumps 50, 70 is generally related to the rotational speed of the pumps 54, 74, respectively, as previously described, the VFDs 86, 88 are thus configured to alter the discharge pressure of pumps 50, 70, respectively, during operation of system 10. The VFDs 86, 88 provide a fine level of control for the rotational speeds of the motors 54, 74 and thus the discharge pressures of the pumps 50, 70.

Still further, as is shown in FIG. 1, in this embodiment controller 82 is also electrically coupled (e.g., through conductors 90) to each of the actuatable valves 43, 44, 45, 47, 48, previously described. Because of this connection, controller 82 is configured to actuate each of the valves 43, 44, 45, 47, and 48 to adjust and control the flow of fluid throughout system 10 during operation.

Figure 8:
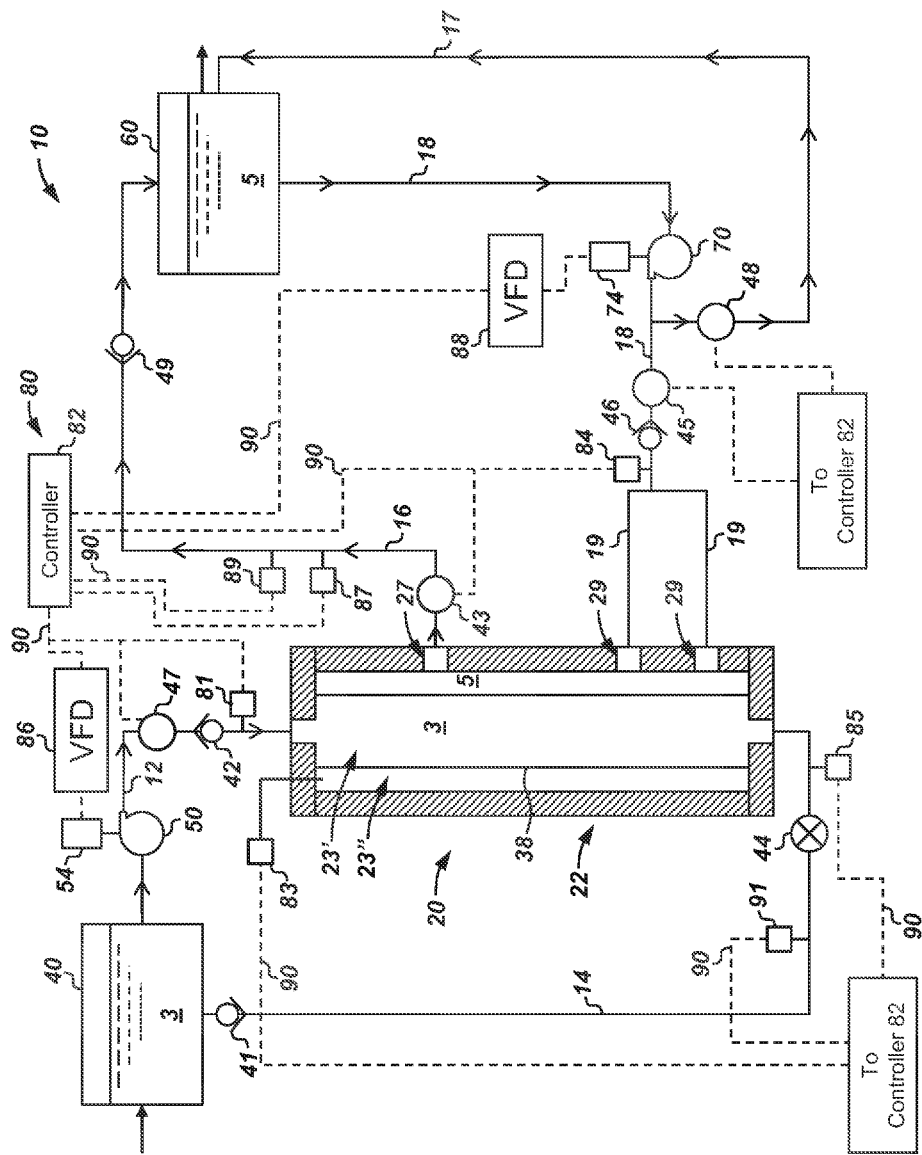
FIG. 8 is a schematic, partial cross-sectional view of the filter system of FIG. 1 operating in an internal clean effect mode of operation.

Referring now to FIG. 8, the system 10 is generally operable in a filtering state. In particular, in some embodiments system 10 is operable in an internal control effect mode (ICE™), in which tank 40 receives dirty fluid 3 (e.g., used flowback frac water, salt water) from a source (not shown) (e.g., an oil and gas well). The fluid 3 within tank 40 includes several impurities including, among other things, suspended solids and other dissolved impurities. For example, in some embodiments, impurities disposed within fluid 3 include long chain hydrocarbons, benzene, toluene, ethylbenzene, calcium, metals, chlorides (e.g., sodium chloride), or some combination thereof. From tank 40, fluid 3 is pumped, via feed pump 50, from tank 40, through line 12 and check valve 42, and into assembly 20. Referring briefly again to FIGS. 2 and 4, fluid 3 enters subchamber 23' of chamber 23 through inlet 11 and flows through holes 39 in screen 38 (or apertures 39'A, 39'B in screen 38' shown in FIG. 5) toward chamber 23". Any suspended solids which are larger than the maximum diameter $D_{39}$ of holes 39 are deposited on the radially inner surface 38c of screen 38, thus filtering such matter out of the dirty fluid 3. In addition, due to the velocity of the fluid as well as other factors such as, for example, the geometry of the chamber 23, the geometry of the intermediate caps 32A, 32B (for embodiments employing intermediate caps 32A, 32B), and the vortex generators 31, 34 (for embodiments employing generators 31, 34) flow patterns are created in fluid 3 within subchamber 23' to promote a relatively even coating of suspended solids on the radially inner surface 38c of screen 38.

Referring still to FIG. 8, after passing through screen 38 and into outer subchamber 23", the newly cleaned fluid 5 then flows out of subchamber 23" through outlet 27 (or outlet 27" for embodiments employing assembly 20" shown in FIG. 7). As previously described, line 16 is fluidly coupled to outlet 27 and thus provides a fluid flow path for clean fluids 5 from assembly 20 to tank 60. During this process, valve 43 is actuated to the open position by controller 82 to allow fluids to freely flow between assembly 20 and tank 60. From tank 60, the cleaned fluid 5 may be discharged from the system 10 and/or pumped back to the original source for further use. In addition, in this embodiment, at least a portion of the fluid in tank 60 is directed through return line 18 by pump 70. Further, some of the fluid discharged by reversing pump 70 flows into recirculation line 17 and back into tank 60 to ensure a sufficient level of fluid within tank 60 during operation. In some embodiments, the flow of fluid through recirculation line 17 establishes a reduction bypass flow path, the size of which varies depending upon the pressure within the system and the disposition of solids along the surface 38c of screen 38. For example, in some embodiments, the flow of fluid through the recirculation line 17 establishes about a 50% reduction bypass flow path (when compared with the feed flow rate into assembly 20); however, in other embodiments, the size of the bypass flow path may be more or less than 50% while still complying with the principles disclosed herein.

In addition, as is shown in FIG. 8, the valve 45 is open. However, in these embodiments, the pressure within subchamber 23" is typically higher than the pressure in line 18. As a result fluid communication between subchamber 23" and the line 18 is at least significantly restricted by the check valve 46. However, when the pressure in subchamber 23" is less than the pressure in line 18, some fluid is allowed to flow past check valve 46 through injection lines 19 and into subchamber 23". This small amount of flow into the subchamber 23" from the lines 19 ensures fluid circulation in the subchamber 23" thereby reducing the likelihood of particulate matter from becoming completely lodged within screen 38. Therefore, in ICE™ mode, use of components such as, for example, VFD 88 and pump 70 allows for a reduction in the amount of particulate disposition on screen 38 while also simultaneously producing filtered fluid 5 to tank 60 and fine tuning the pressure within subchamber 23" to optimize cavitation (discussed below) within filter assembly 20.

Figure 9:
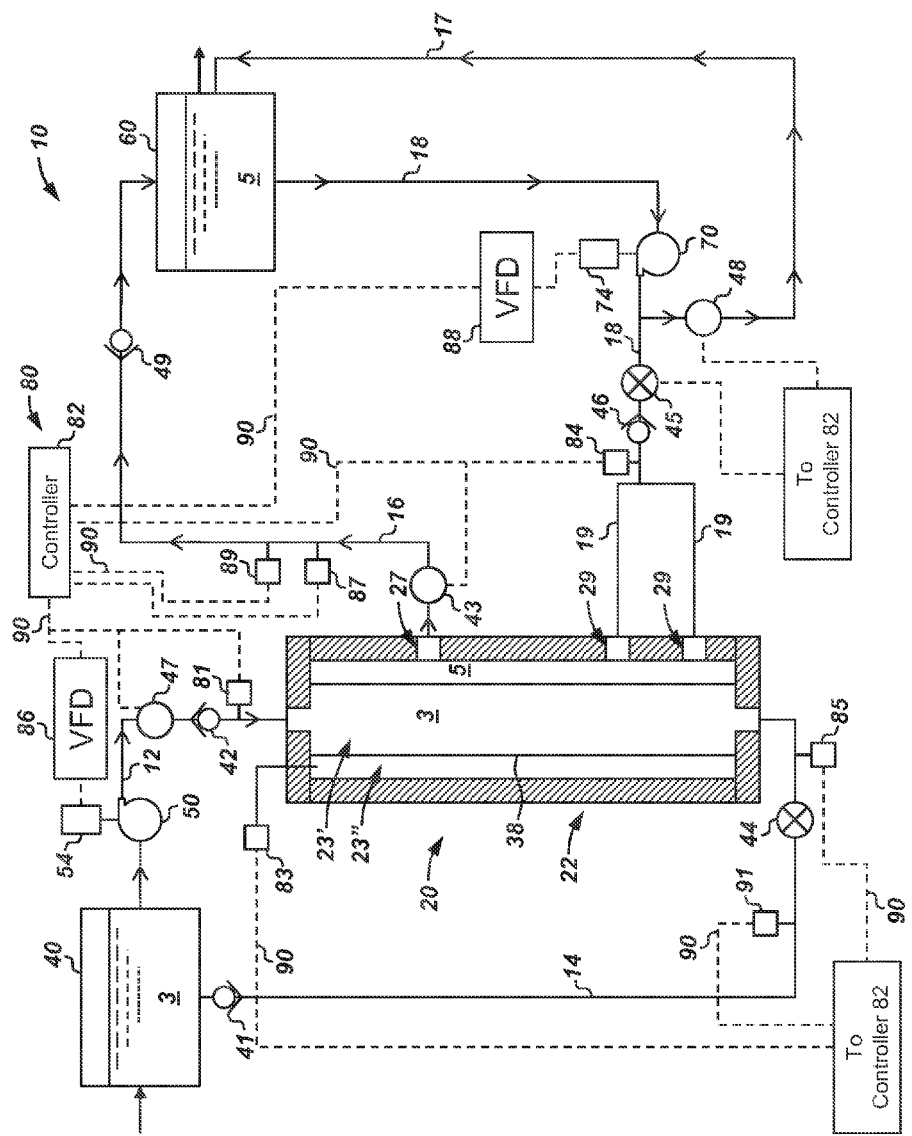
FIG. 9 is a schematic, partial cross-sectional view of the filter system of FIG. 1 operating in a separation clean effect mode of operation.

Referring now to FIG. 9, system 10 may also be operated in a separation clean mode (SC™) in which the valve 45 is closed, and fluid 3 is pumped through assembly 20 and into tank 60 as previously described above for the ICE™ mode of operation. However, because the valve 45 is closed, no or substantially no fluid is allowed to return to subchamber 23", thus reducing the amount or level of fluid circulation in the outer subchamber 23" through lines 19. In some embodiments, the decision to operate system 10 in either ICE™ mode or SC™ mode is determined by a number of factors such as, for example, the specific fluid 3 or impurities contained within fluid 3, the amount of impurities contained within fluid 3, and the specific gravity of fluid 3.

Figure 10:
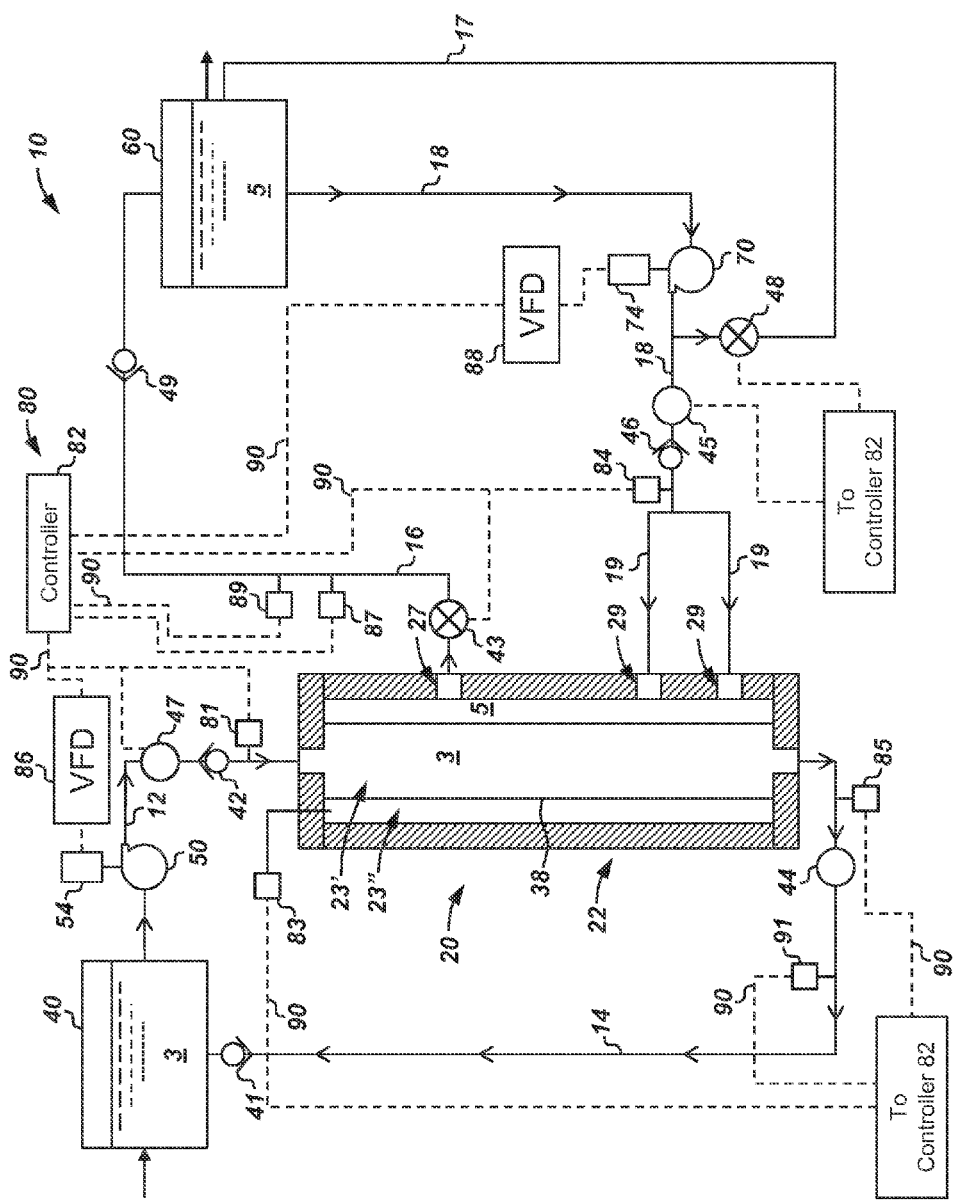
FIG. 10 is a schematic, partial cross-sectional view of the filter system of FIG. 1 operating in a reject state.
Figure 11:
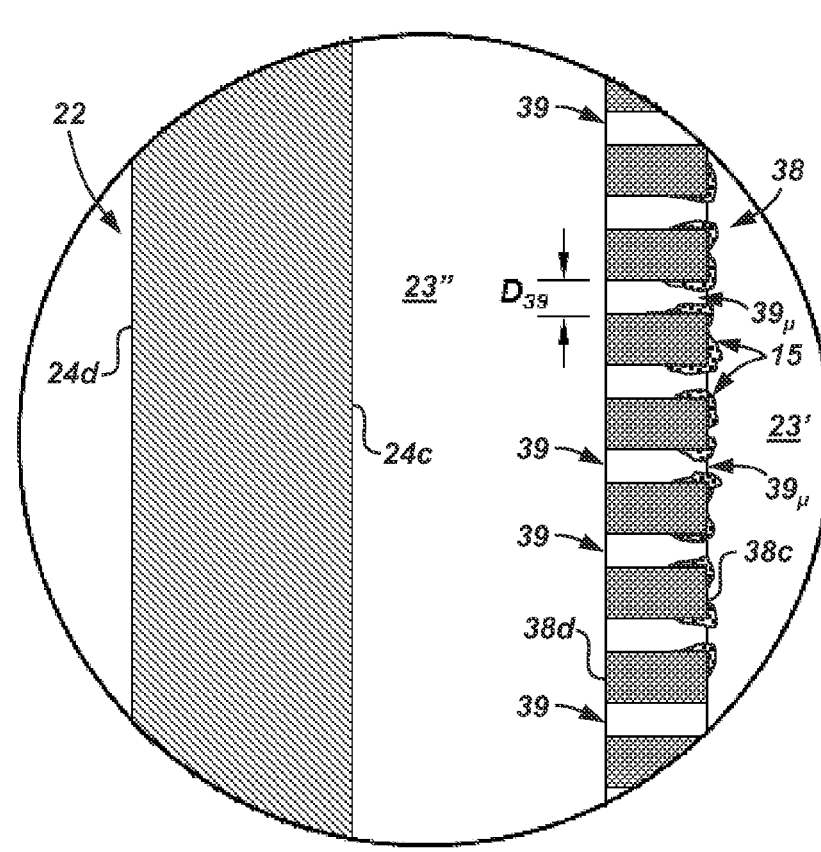
FIG. 11 is an enlarged schematic, cross-sectional view of the filter screen of the filter assembly of FIG. 4 with micro-holes formed on the radially inner surface thereof.

Referring now to FIG. 10, regardless of the chosen operating mode (e.g., ICE™, SC™, or other mode) over time, particulate matter begins to build up along the radially inner surface 38c of screen 38 (see FIG. 2), such that it becomes necessary for system 10 to enter a reject state in which fluid flow is reversed within assembly 20 to sweep or clean at least a portion of this buildup from screen 38. In particular, the controller 82 closes valves 43 and 48 and opens the valves 44 and 45. Once the valve 48 is closed, the pressure within line 18 increases (e.g., due to the influence of pump 70) such that it is greater than the pressure within subchamber 23", thereby allowing fluid to flow from line 18, through check valve 46, into the injection lines 19, and into the inlets 29, previously described. After fluid enters outer subchamber 23" from inlets 29, it flows through the holes 39 in screen 38 from the radially outer surface 38d to the radially inner surface 38c and into the inner subchamber 23' thereby dislodging or sweeping any suspended solids that have built up along surface 38c. As shown in FIG. 10, multiple lines 19 and inlets 29 are provided to allow the fluid flowing into the subchamber 23" to enter at multiple points, and thereby promote cleaning or sweeping of most if not the entire surface 38c of screen 38. Once fluid has entered the inner subchamber 23' from lines 19, it is blocked or restricted from flowing back through line 12 into tank 40 by check valve 42. However, because the valve 44 is open, the fluid and the swept particulate matter is allowed to flow from inner chamber 23' through fluid outlet 13 and into flush line 14. In this embodiment, flush line 14 directs the fluid from assembly 20 back to dirty tank 40; however, it should be appreciated that in other embodiments, line 14 may direct the fluid to another separate tank (other than tank 40 or tank 60) or may expel the fluid from the system 10 entirely. In addition, it should be appreciated that in some embodiments, operation in ICE™ mode, previously described, may allow an operator to minimize the amount of time the system 10 must be run in a reject state (e.g., as shown in FIG. 10) due to the small amount of recirculation back into the chamber 23" through lines 19, thereby increasing the amount of time that system 10 may be run to continuously filter fluids (e.g., fluid 3) during operation.

Referring now to FIGS. 8-10, during operation of system 10, control system 80 takes in measurements from the various sensors (e.g., sensors 81, 83, 84, 87, 89) and adjusts the speeds of the pumps 50, 70 through the VFDs 86, 88, respectively, and actuates the valves 43, 44, 45, 47, 48 to enhance and optimize the cleaning of impurities from the dirty fluid 3. As previously described, in this embodiment, controller 82 comprises a PID control loop. In general, the controller 82 receives the measured values of pressure both from the inner subchamber 23' via the sensor 81 and from the outer subchamber 23" via the sensor 89 during operation. The controller 82 then adjusts the rotational speed of motor 54 and pump 50 through VFD 86, in the manner previously described, to adjust the discharge pressure from pump 50 and thus the pressure within the inner chamber 23' relative to the pressure within outer chamber 23". In some embodiments, the controller 82 adjusts the rotational speed and thus the discharge pressure of pump 70 either in addition to or in lieu of adjusting the discharge pressure of the pump 50 to further optimize and control the pressure difference between the subchambers 23', 23". Because of the fine level of control provided by the VFDs 86, 88, the discharge pressures of the pumps 50, 70 can be controlled quickly, continuously, and at various rates of change.

Generally speaking, the goal of these adjustments by controller 82 is to maintain a predetermined pressure differential or pressure ratio between the subchambers 23', 23" to induce and maintain cavitation within the fluid 3 and further precipitate out dissolved solids from fluid 3 in addition to filtering suspended solids during operation. For example, as previously described, during normal operation of system 10 (whether in ICE™, SC™, or some other mode of operation), dirty fluid 3 is pumped or flowed from the inner subchamber 23' to the outer subchamber 23" such that screen 38 may clean or strain suspended solids therefrom. As is best shown in FIG. 10, during this process suspended solids within the working fluid 3 collect or accumulate as deposits 15 along the radially inner surface 38c of screen 38 and thus partially clog the holes 39, thereby reducing the effective maximum diameter or clearance $D_{39}$ and creating "micro-apertures" or "micro-holes" $39_\mu$. Without being limited by this or any particular theory, as fluid flows through the newly formed micro-holes $39_\mu$, the pressure drops at the throat of constriction thereby allowing the static pressure of fluid 3 to fall below the vapor pressure, and thus causing cavitation to occur. As cavitation occurs within the holes $39_\mu$, the solubility of the fluid is altered and dissolved solids (e.g., sodium chloride, NaCl) within the fluid begin to crystalize. In particular, as fluid cavitation occurs, small bubbles form which then subsequently collapse thereby releasing an amount of kinetic energy. The released energy operates to dissociate polar water molecules from surrounding cations and anions, which were previously bonded to the water molecules in the aqueous solution. The newly released cations and anions then recombine and thus precipitate out of solution in the form of crystals. These newly formed crystals adhere to the nucleation sites formed by deposits 15 distributed along the radially inner surface 38c and thus are also filtered out of the fluid 3. In order for cavitation to occur in the manner described above, the effective diameter $D_{39}$ of the micro-holes $39_\mu$ must fall within a certain range. In at least some embodiments, the pressure differential between the subchambers 23', 23" is directly related to the size of the micro-holes $39_\mu$. Thus, at least one goal of the control system 80 is to optimize the pressure differential or pressure ratio between subchamber 23', 23" such that micro-holes $39_\mu$ form along the radially inner surface 38c of screen 38 thereby allowing cavitation to occur within and proximate the holes $39_\mu$ to enhance the assembly 20's (or the assemblies 20', 20") ability to remove dissolved impurities from the fluid in addition to suspended solids. In some embodiments, the desired pressure differential is achieved and maintained through observation of the pressures measured in both the subchamber 23' (e.g., through sensor 81) and the subchamber 23" (e.g., through sensor 89), and subsequent adjustment of the rotational speed and thus the discharge pressure of the pump 50 and/or the pump 70 (e.g., via VFDs 86, 88, respectively).

In one specific example, when the measured pressure differential between the subchambers 23', 23" rises over a pre-determined value or range of values, the controller 82 directs the VFD 86 to decrease the rotational speed and thus the discharge pressure of the feed pump 50. Conversely, when the measured differential pressure between the subchambers 23', 23" falls below the pre-determined value of range of values, the controller 82 directs the VFD 86 to increase the rotational speed and thus the discharge pressure of the feed pump 50. The pre-determined value or range of values for the desired pressure differential is determined by a number of factors, including, for example, the type of fluid 3, the level or amount of impurities contained within fluid 3, or the specific gravity of fluid 3. The fine level of control provided by the VFD 86 allows flexibility in the way the feed pump 50 reacts to the measured pressure differential. The VFD 86 can cause the feed pump 50 to respond quickly to pressure changes, and to vary the pressure response based on the rate of change of the measured pressure differential.

Referring still to FIGS. 8-11, in some embodiments, controller 82 may adjust the discharge pressure of the feed pump 50 and/or the pump 70 based at least partially on the measurements obtained from the conductivity sensor 87 disposed on line 16. Such adjustment may take place either in addition to or in lieu of adjustments based on other measured values (e.g., pressure). In particular, for some applications, many of the dissolved impurities within the fluid comprise ions or ionic compounds (e.g., sodium chloride). Thus, during operation sensor 87 measures electrical properties (e.g., electrical conductivity) of the fluid 5 in discharge line 16 in order to detect the level of dissolved impurities within the fluid 5 to give an indication of the effectiveness of the cleaning process taking place within assembly 20 (e.g., by comparing the sensed conductivity to a known or predetermined value or range of values). The controller 82 may then adjust the discharge pressure of the pump 50 and/or the pump 70 (e.g., via the VFDs 86, 88, respectively) based at least partially on the output from the sensor 87 to optimize the pressure differential between the subchambers 23', 23" and thus facilitate fluid cavitation to remove such dissolved impurities.

Further, in some embodiments, controller 82 may adjust the discharge pressure of the pump 50 and/or the pump 70 based at least partially on the measurements obtained from the acoustic sensor 83 disposed on vessel 22. Such adjustment may take place either in addition to or in lieu of adjustments based on other measured values (e.g., pressure, conductivity). In particular, when cavitation is occurring within chamber 23 small bubbles form and collapse in the manner previously described, thereby resulting in the formation of a pressure wave. These generated pressure waves have a determinable acoustic frequency $\omega_R$. Thus, in at least some embodiments, the controller 82 is configured to measure an audio signal in the frequency range for fluid in subchamber 23" via the sensor 83 during operation and compare it to a pre-determined value or range of values. The pre-determined value or range of values for the frequency is determined based on the expected acoustic resonant frequencies $\omega_R$ which result when the fluid cavitation is occurring. In some embodiments, the anticipated frequency of vibration $\omega_R$ in which cavitation is occurring within chamber 23 may be between 200 Hz and 20,000 Hz. The controller 82 may then adjust the discharge pressure of the pump 50 and/or the pump 70 (e.g., via the VFDs 86, 88, respectively)

based at least partially on the output of the sensor 83 to optimize the pressure differential between the subchambers 23', 23" and thus maintain fluid cavitation to remove any dissolved impurities. As previously discussed, the discharge pressure response of the pumps 50, 70 is immediate, variable, and continuous as needed based on the functionality of the VFDs 86, 88.

Figure 12:
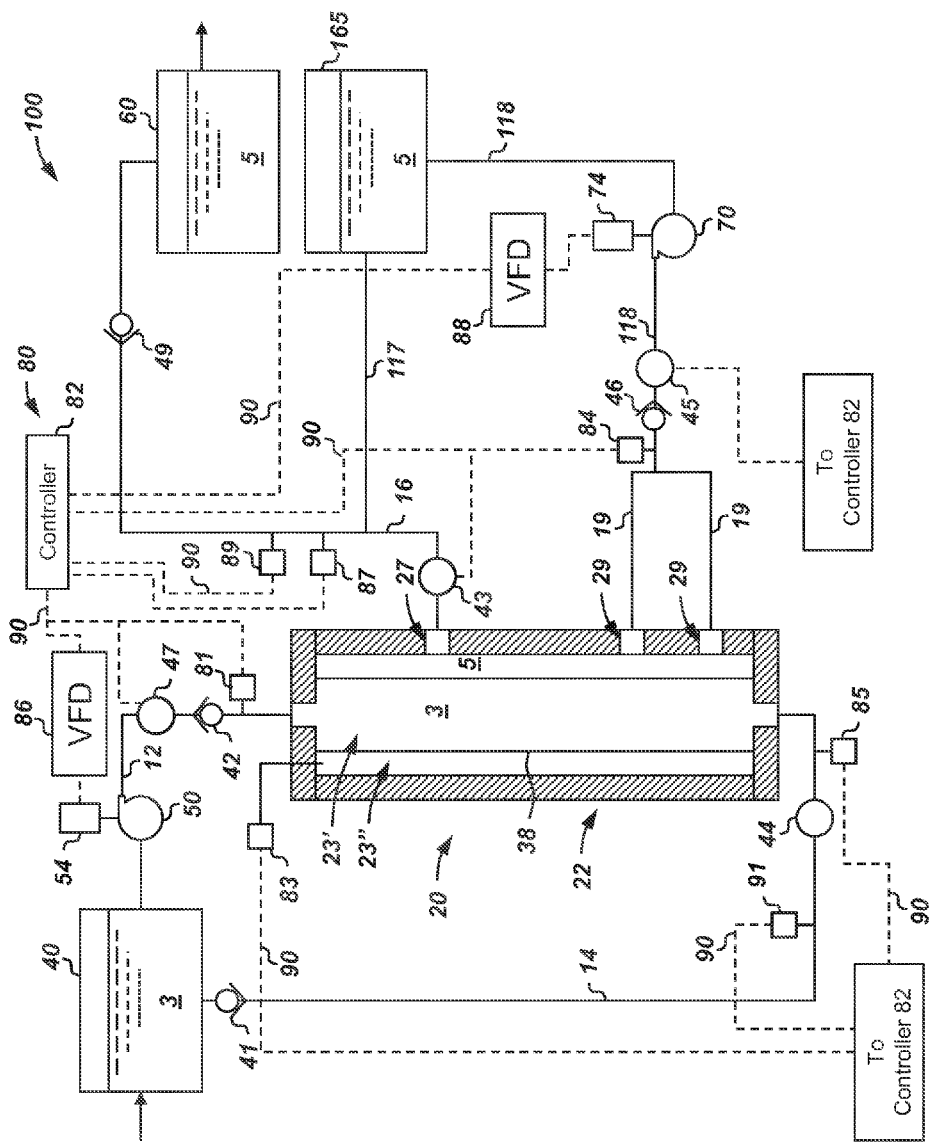
FIG. 12 is a schematic, partial cross-sectional view of another embodiment of a filter system in accordance with the principles disclosed herein.
Figure 13:
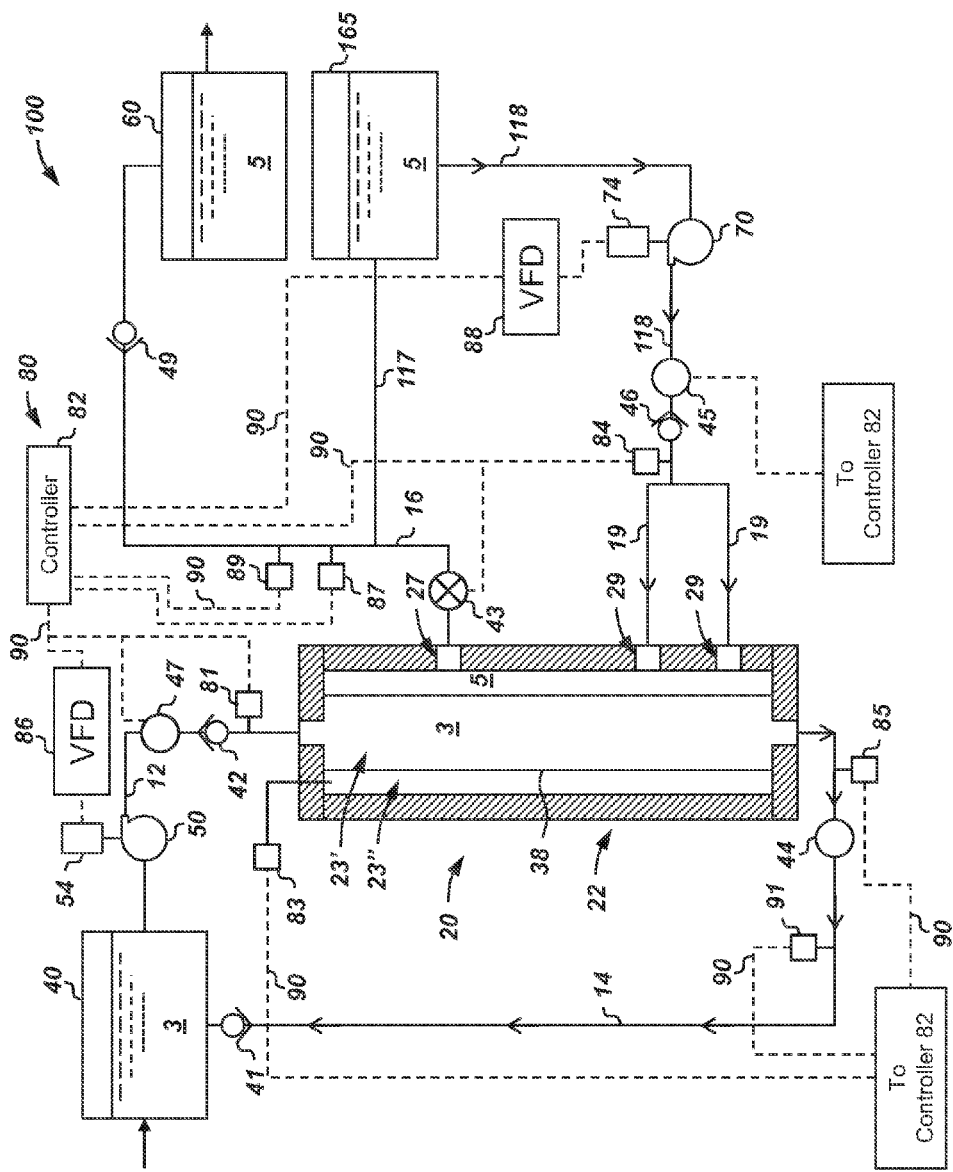
FIG. 13 is a schematic, partial cross-sectional view of the filter system of FIG. 11 operating in a reject state.

Referring to FIGS. 12-13, another embodiment of a filter system 100 is shown. Filter system 100 includes many similar components relative to the filter system 10. As a result, like reference numerals are used for like components and features, and shared components may not be called out or discussed in detail with reference to FIGS. 12-113 but the same description with regard to FIGS. 1-11 applies equally to the system of FIGS. 12-13 unless otherwise noted. Instead, the focus of the discussion will be on variations or differences in the filter system 100 over the filter system 10. In general, the system 100 is the same as system 10, previously described; however, system 100 does not include a recirculation line 17. Instead, the filter system 100 includes an additional prime tank 165 that is coupled to discharge line 16 through a branch 117. Prime tank 165 is also coupled to pump 70 through a priming line 118. Line 118 is further coupled to the pair of injection lines 19, previously described. Further, as shown in FIG. 12, the valves 46 and 45 are also disposed along line 118. Referring specifically to FIG. 13, the operation of system 100 is substantially the same as described above for system 10; however, when system 100 enters a reject state of operation, fluid 5 flows from prime tank 165 (instead of clean water tank 60), through line 118, and into lines 119 to clean or sweep the screen 38.

Figure 14:
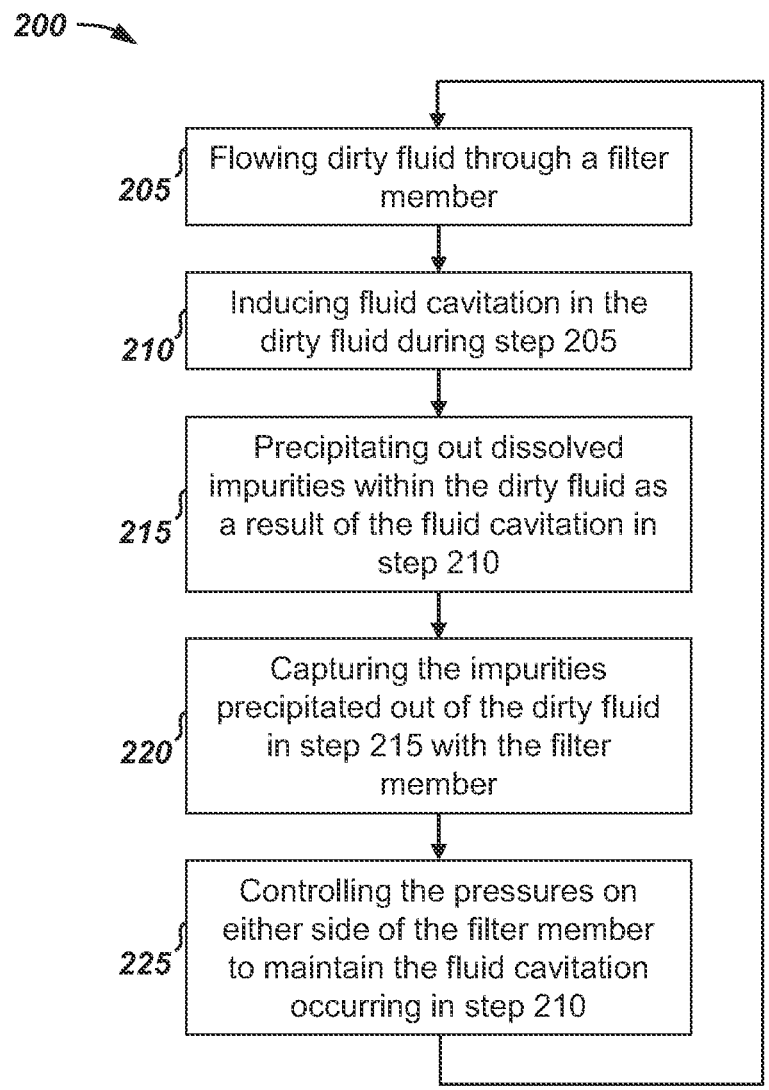
FIG. 14 shows a block diagram of an embodiment of a method of filtering fluids in accordance with the principles disclosed herein.

Referring now to FIG. 14 wherein a method 200 for filtering a fluid containing some amount of dissolved impurities (e.g., fluid 3) is shown. In order to provide context and enhance clarity, method 200 will be explained with reference to components and features of filter system 10, previously described; however, it should be appreciated that method 200 may be carried out with any suitable system other than system 10 (e.g., system 100 or some other suitable system) while still complying with the principles disclosed herein.

Method 200 begins by flowing dirty fluid (e.g., fluid 3) through a filter member in step 205. The filter member may be any suitable screen (e.g., screen 38, 38', etc.) membrane or other suitable member for filtering impurities from a fluid while still complying with the principles disclosed herein. As fluid is being routed through the filter member in step 205, fluid cavitation is induced in step 210 such that bubbles are formed and then subsequently collapse in the manner described above. As a result of the cavitation occurring in step 210, at least a portion of the dissolved impurities within the dirty fluid are precipitated out of the dirty fluid in step 215. In some embodiments, dissolved solids are precipitated out of the dirty fluid in step 215 in the same manner as previously described above for system 10. The method 200 next includes capturing the impurities precipitated out of the dirty fluid in step 215 with the filter member in step 220. Finally, the method 200 includes controlling the pressures (e.g., through pumps 50, 70, motors 54, 74, and VFDs 86, 88) on either side of the filter member (e.g., in subchambers 23', 23") in step 225 to facilitate and maintain the fluid cavitation occurring in step 210.

In some embodiments, the dirty fluid is salt water (e.g., such as sea water) and the dissolved impurities comprise, among other things, sodium chloride (NaCl). Thus, in these embodiments, when cavitation occurs in step 205, the kinetic energy released as a result of the collapse of bubbles formed during cavitation precipitates the sodium (Na) and chloride (Cl) molecules out of the solution in the manner previously described above such that crystalized sodium chloride NaCl forms which is then captured with the filter member in step 220.

Figure 15:
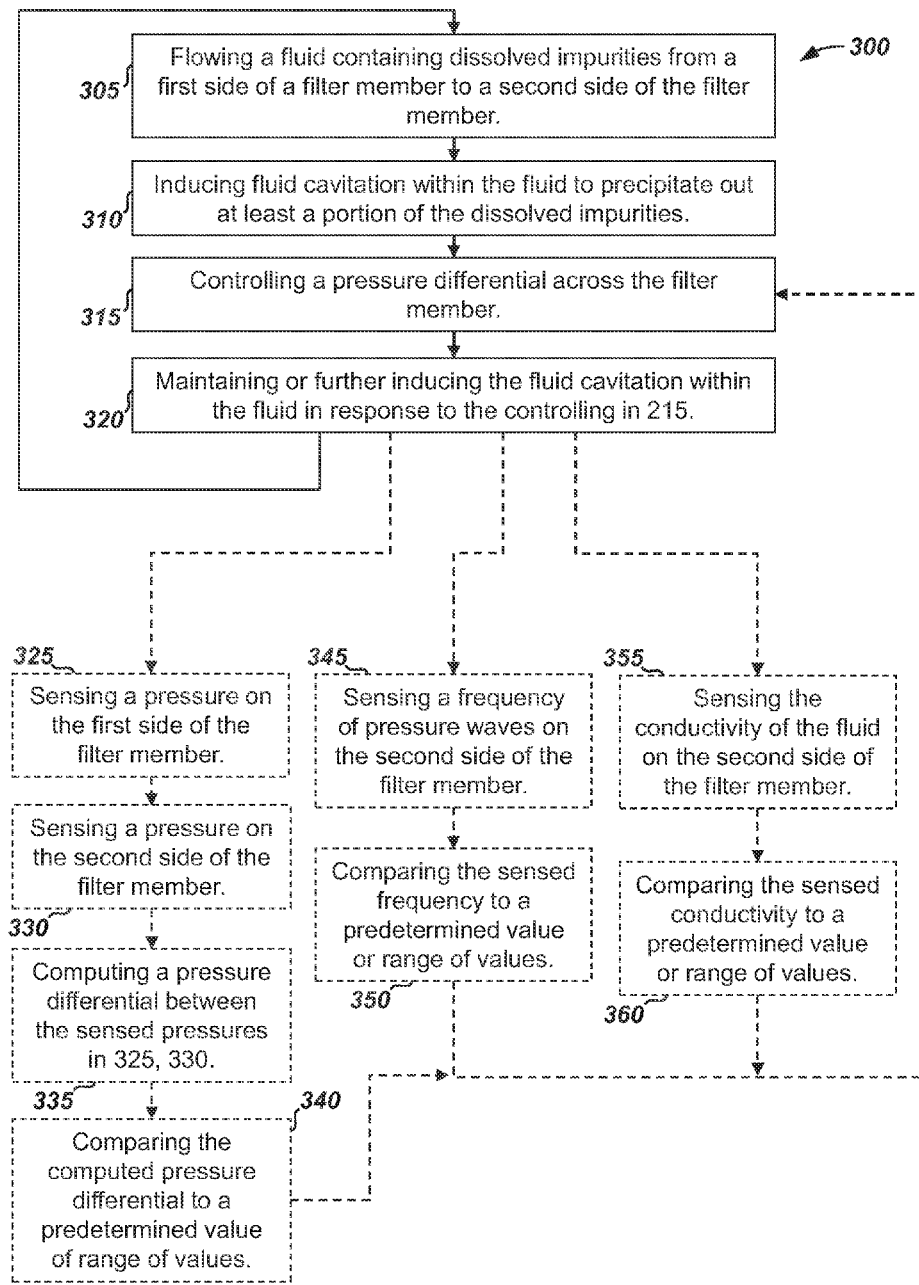
FIG. 15 shows a block diagram of another embodiment of a method of filtering fluids in accordance with the principles disclosed herein.

Referring now to FIG. 15 wherein another method 300 for filtering a fluid containing some amount of dissolved impurities (e.g., fluid 3) is shown. In order to provide context and enhance clarity, method 300 will be explained with reference to components and features of filter system 10, previously described; however, it should be appreciated that method 300 may be carried out with any suitable system other than system 10 (e.g., system 100 or some other suitable system) while still complying with the principles disclosed herein.

Method 300 begins by flowing a fluid from a first side (e.g., subchamber 23') of a filter member to a second side (e.g., subchamber 23") of the filter member in step 305. As with method 200, previously described, the filter member may be any suitable screen (e.g., screen 38, 38', etc.) membrane or other suitable member for filtering impurities from a fluid while still complying with the principles disclosed herein. In addition, in some embodiments, the fluid contains suspended and/or dissolved impurities (e.g., NaCl). The method 300 also includes inducing fluid cavitation within the fluid to precipitate out at least a portion of the dissolved impurities in step 310. In some embodiments, dissolved solids are precipitated out of the fluid in step 310 in the same manner as previously described above for system 10. The method 300 further includes controlling a pressure differential across the filter member (e.g., through pumps 50, 70, motors 54, 74, and VFDs 86, 88), between the first and second sides (e.g., in subchambers 23'. 23") in step 315, and maintaining or further inducing the fluid cavitation within the fluid in step 320 in response to the controlling of step 315. Thereafter, in some embodiments, method 300 reinitiates step 305.

Method 300 also includes several optional steps of which all or some may be performed in addition to steps 305-320, previously described. In particular, in some embodiments, method 300 includes the optional step of sensing a pressure on the first side (e.g., subchamber 23') of the filter member in step 325 and sensing a pressure on the second side (e.g., subchamber 23") of the filter member in step 330. Thereafter, step 335 includes computing a pressure differential between the sensed pressures in steps 325, 330. Finally, method 300 includes comparing the computed pressure differential of step 335 to a predetermined value or range of values in step 340 (e.g., with controller 82) such that the comparison may be used to at least partially affect the controlling of step 315.

In some embodiments, method 300 also includes the optional step of sensing a frequency of pressure waves on the second side (e.g., subchamber 23") of the filter member (e.g., with sensor 83) in step 345. Thereafter, step 350 includes comparing the sensed frequency in step 345 to a predetermined value or range of values such that the comparison may be used to at least partially affect the controlling of step 315 (e.g., with controller 82).

In still some embodiments, method 300 includes the optional step of sensing the conductivity of the fluid on the second side of the filter member (e.g., with conductivity sensor 87) in step 355. Thereafter, step 360 includes comparing the sensed conductivity in step 355 with a predetermined value or range of values such that the comparison may be used to at least partially affect the controlling in step 315 (e.g., with controller 82).

Through use of a filter system (e.g., system 10, 100) according to the principles disclosed herein, the filtration of fluid (e.g., used flowback frac water, salt water) is enhanced, thereby facilitating more effective removal of both suspended solids and other dissolved impurities. Further, through use of a filter system according to the principles disclosed herein, more effective filtration of a fluid is achieved by inducing and maintaining cavitation in the filtered fluid during the filtering process by a control system (e.g., system 80) that closely manages and manipulates differential pressures in the system.

While embodiments disclosed herein have shown only a single filter assembly 20 (or assembly 20') included within system 10 (or system 100), it should be appreciated that in other embodiments, more than one assembly 20 (or assembly 20') may be included either in parallel, in series, or in some combination thereof within system 10 or 100 while still complying with the principles disclosed herein. In addition, while embodiments disclosed herein have included two lines 19, it should be appreciated that other embodiments may have more or less than two lines 19. Further, while embodiments disclosed herein have described the controller 82 as being a single component, it should be appreciated that in other embodiments, the controller 82 may comprise multiples components and may comprise multiple individual control units or control circuits which correspond to different components and features of the filter system (e.g., system 10, 100). Still further, while embodiments disclosed herein have described the use of pressure, flow rate, acoustic, and conductivity sensors within the systems 10, 100, it should be appreciated that in other embodiments, other sensors may be utilized with the system 10, 100 which measure various other values and parameters while still complying with the principles disclosed herein. For example, in some embodiments, temperature sensors may be disposed along the various lines 12, 14, 16, 17, 18, 117. Additionally, in some embodiments level sensors may be included on the tanks 40, 60, 165 to provide a measure of the level of fluids within tanks 40, 60, 165 during operation. Further, while embodiments disclosed herein have shown and described only a single system 10, 100, it should be appreciated that in some embodiments, multiple systems 10 or 100 may be coupled in series, in parallel, or in some combination thereof in order to effect cleaning of fluids during operation. Still further, while embodiments disclosed herein have described a filter system (e.g., system 10, 100) being used to filter particles from fluid used in the oil and gas industry during drilling or completion of earthen wellbores, it should be appreciated that in other embodiments, the previously described filtering systems may be used in connection with any suitable processes or industry which requires the filtration of particles from fluids. For example, some embodiments of filter systems 10 and/or 100, previously described, may be used to filter fluids such as industrial waste waters, reclaimed waters from food processing, and sea water while still complying with the principles disclosed herein. While only the filter assembly 20' shown in FIG. 3 has been shown and described to include a mounting device (e.g., plate 73) it should be appreciated that any embodiment of assemblies 20 and 20" may also include plate 73 or some other suitable mounting device while still complying with the principle disclosed herein. Further, it should be appreciated that in some embodiments, VFDs 86, 88, may be replaced with any suitable throttling or adjustment assembly configured to adjust the output rotational speed of the motors 54, 74 to control the pressure differential between the subchambers 23', 23" while still complying with the principles disclosed herein. For example, in some embodiments, motors 54, 74 are hydraulically driven and VFDs 86, 88 are replaced with throttling valves which control the flow of hydraulic fluid through motors 54, 74 thus controlling the output rotational speed thereof.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of filtering a fluid, comprising:
   flowing a fluid from a first side of a filter member, through holes in the filter member, and to a second side of the filter member, the fluid containing suspended solids and dissolved impurities;
   accumulating at least a portion of the suspended solids in the holes of the filter member to constrict the holes into micro-holes, thereby causing a pressure differential across the micro-holes and inducing fluid cavitation in the fluid in the micro-holes that precipitates out at least a portion of the dissolved impurities;
   accumulating at least a portion of the precipitated impurities in the micro-holes of the filter member to filter the precipitated impurities from the fluid; and
   controlling an effective diameter of the micro-holes by continuously controlling the pressure differential across micro-holes to maintain the fluid cavitation in the fluid in the micro-holes and the filtering of the precipitated impurities.

2. The method of claim 1, wherein flowing the fluid comprises pumping the fluid with a feed pump; wherein controlling the pressure differential comprises adjusting an output pressure of the feed pump.

3. The method of claim 2, further comprising: sensing a pressure on the first side of the filter member; sensing a pressure on the second side of the filter member; and adjusting the output pressure of the feed pump based on the pressures.

4. The method of claim 2, further comprising: sensing a frequency of pressure waves on the second side of the filter member; and adjusting the output pressure of the feed pump based on the frequency.

5. The method of claim 2, further comprising: sensing the conductivity of the fluid on the second side of the filter member; and adjusting the output pressure of the feed pump based on the conductivity.

6. A method of filtering a fluid, comprising:
   flowing a fluid from a first side of a filter member, through a plurality of apertures in the filter member, and to a second side of the filter member, the fluid containing suspended solids and dissolved impurities, accumulating at least a portion of the suspended solids on the filter member thereby causing a pressure differential across the filter member and inducing fluid cavitation in the fluid that precipitates out at least a portion of the dissolved impurities;

accumulating at least a portion of the precipitated impurities on the filter member to filter the precipitated impurities from the fluid; and controlling the pressure differential to a desired pressure differential to maintain the fluid cavitation and filtering of the precipitated impurities;

wherein the controlling the pressure differential to the desired pressure differential is based on a pre-determined range of an effective diameter of the apertures.

7. The method of claim 1 wherein the flowing the fluid step is in an initial filtering and feed flow direction, and each step of the method occurs in the same feed flow direction.

\* \* \* \* \*